United States Patent [19]

Tsengas

[11] Patent Number: 5,730,081
[45] Date of Patent: *Mar. 24, 1998

[54] ANIMAL FEEDER ASSEMBLY

[76] Inventor: Steven Tsengas, 7768 Litchfield Dr., Mentor, Ohio 44060

[*] Notice: The term of this patent shall not extend beyond the expiration date of Pat. No. 5,509,376.

[21] Appl. No.: 627,210

[22] Filed: Apr. 3, 1996

Related U.S. Application Data

[63] Continuation of Ser. No. 290,235, Aug. 15, 1994, Pat. No. 5,509,376.
[51] Int. Cl.$^6$ .................................................. A01K 5/01
[52] U.S. Cl. .................. 119/51.5; 119/61; 108/156; 248/151
[58] Field of Search .................. 119/51.5, 61; 248/146, 248/151, 165; 108/14, 18, 19, 26, 156; 446/482, 117, 118, 124, 125; D21/121, 122, 123

[56] References Cited

U.S. PATENT DOCUMENTS

| | | |
|---|---|---|
| D. 258,018 | 1/1981 | Venditto et al. ............... D30/16 |
| D. 340,552 | 10/1993 | Smith ............................ D30/122 |
| 1,855,314 | 4/1932 | Schacht . |
| 2,555,396 | 6/1951 | Cosner . |
| 2,841,114 | 7/1958 | Grant . |
| 3,538,906 | 11/1970 | Heraty et al. . |
| 3,651,787 | 3/1972 | Cooper . |
| 3,687,092 | 8/1972 | Manning . |
| 3,865,050 | 2/1975 | Cecchetti . |
| 3,875,873 | 4/1975 | Howitt ............................ 248/151 |
| 3,995,595 | 12/1976 | Williams . |
| 4,044,723 | 8/1977 | Fitzpatrick . |
| 4,065,195 | 12/1977 | Fahmie ........................... 312/258 |
| 4,143,915 | 3/1979 | Kammlay ....................... 108/156 |
| 4,359,786 | 11/1982 | Rosberg et al. . |
| 4,574,709 | 3/1986 | Lackey et al. . |
| 4,658,759 | 4/1987 | Brown . |
| 4,699,089 | 10/1987 | Teschke . |
| 4,793,288 | 12/1988 | Hoadley . |
| 4,852,837 | 8/1989 | Merten et al. .................. 108/156 |
| 4,953,506 | 9/1990 | Sanders . |
| 4,966,099 | 10/1990 | Arney . |
| 4,972,781 | 11/1990 | Montgomery et al. ......... 108/19 |
| 4,976,223 | 12/1990 | Pierce . |
| 5,000,123 | 3/1991 | Morse et al. ................... 119/61 |
| 5,054,431 | 10/1991 | Coviello . |
| 5,483,904 | 1/1996 | Kelly et al. .................... 108/156 |

FOREIGN PATENT DOCUMENTS

| | | | |
|---|---|---|---|
| 3300770 | 7/1984 | Germany ............... | 119/61 |
| 2188525 | 10/1987 | United Kingdom .... | 119/61 |

OTHER PUBLICATIONS

Printed Publication titled Pedigrees "The Pet Catalog," Summer Preview 1991.

Printed Publication titled "Spiegel Catalog," believed to have been received at the United States Patent an Trademark Office Nov. 16, 1990.

*Primary Examiner*—Todd E. Manahan
*Attorney, Agent, or Firm*—Oldham & Oldham Co., L.P.A.

[57] ABSTRACT

An animal feeder assembly provides food and water at an elevated position from a support surface and is therefore particularly suited for feeding large dogs in a manner which avoids digestive and posture problems associated with feeding such animals from containers positioned at the level of the support surface. The feeder assembly comprises a feeder tray and a plurality of hollow legs releasably attached to the feeder tray. Each of the hollow legs are capable of holding ballast material such as sand or water for lowering the center of gravity of the assembly relative to the support surface, thereby enhancing the stability of the assembly and inhibiting the animal form transporting the feeder assembly from the preferred feeding location. The tray and legs are preferably made of blow molded plastic and the tray is formed to include a closed interior cavity, each of which facilitates cleaning the assembly. Each leg is releasably attached to the tray and may be releasably locked to a receptacle formed in a bottom surface of the tray.

24 Claims, 6 Drawing Sheets

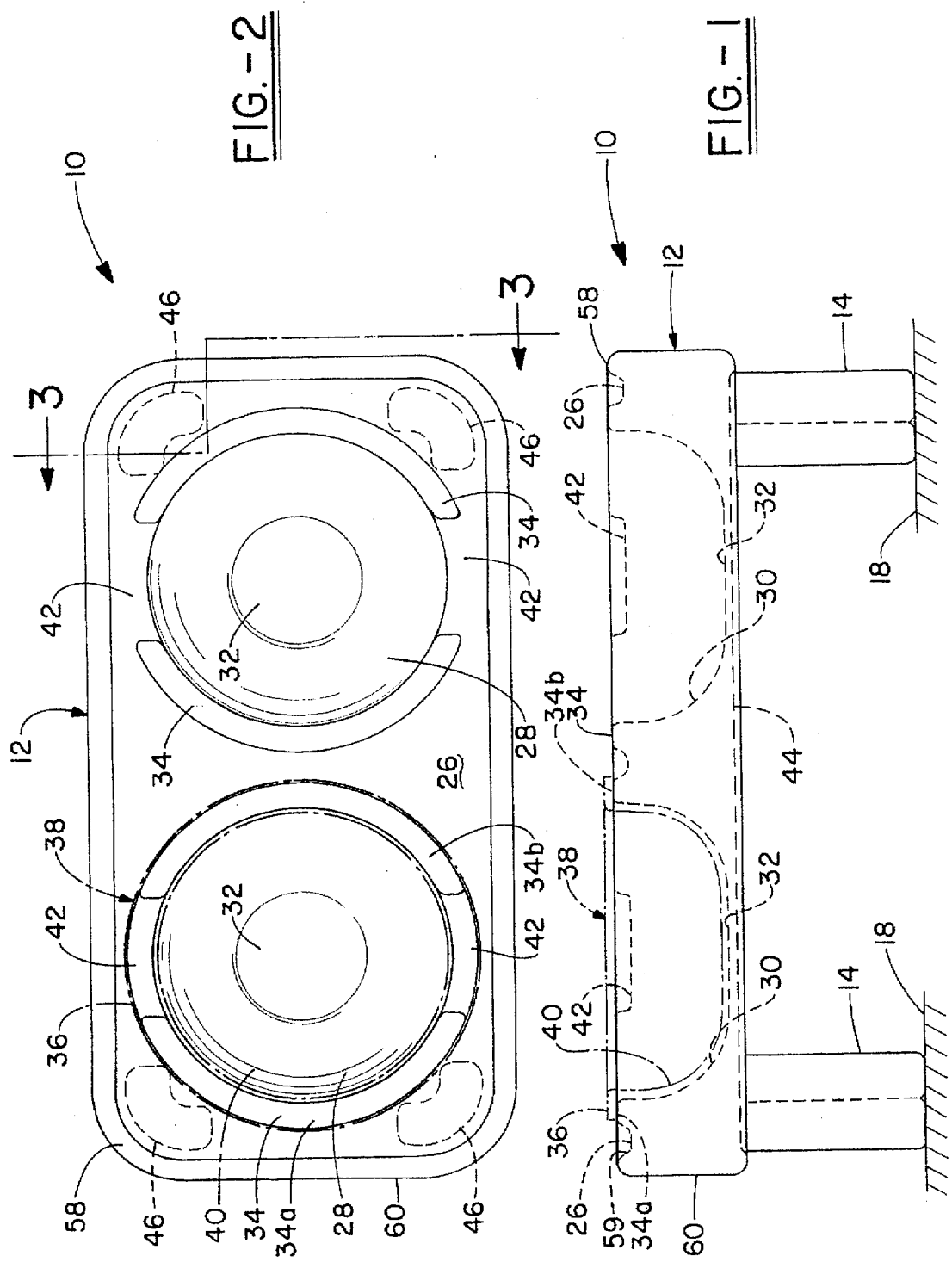

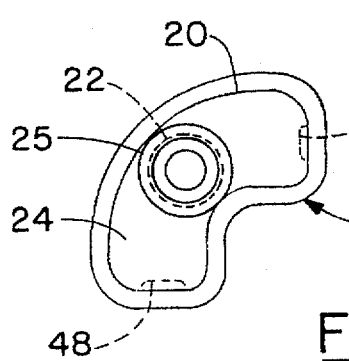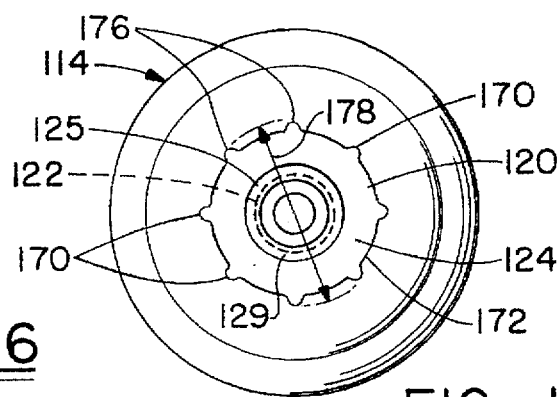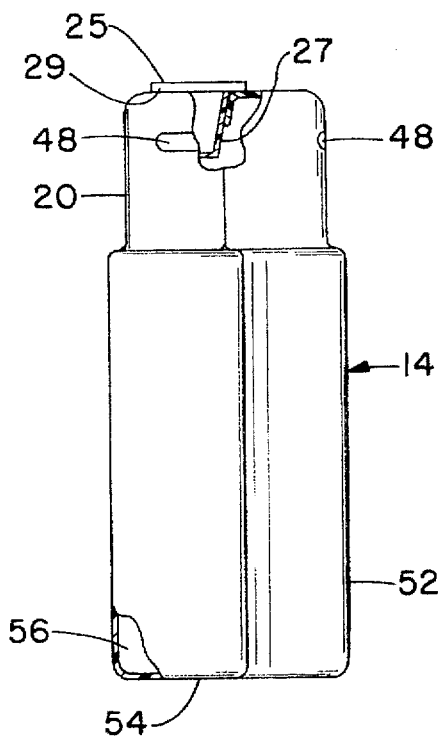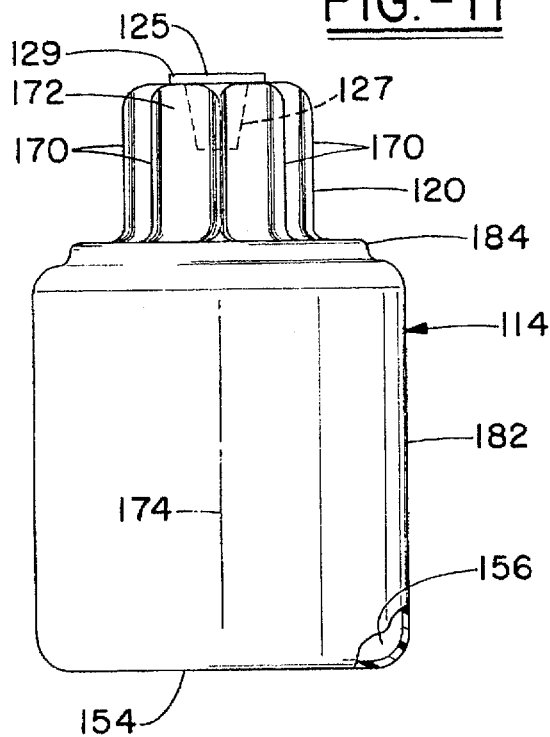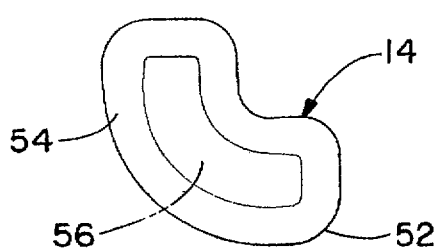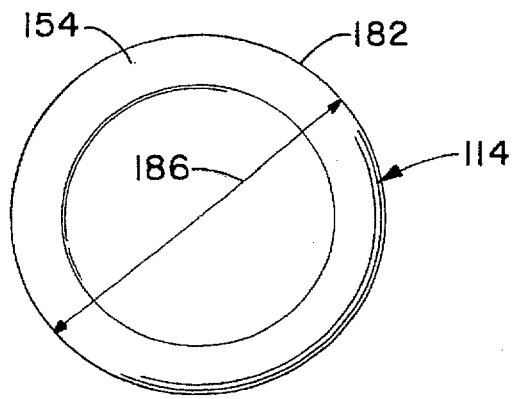

ANIMAL FEEDER ASSEMBLY

This is a continuation of application Ser. No. 08/290,235 filed on Aug. 15, 1994 now U.S. Pat. No. 5,509,376.

BACKGROUND OF THE INVENTION

1.0 Field of the Invention

The present invention relates generally to animal feeder assemblies and, more particularly, to a feeder assembly which is particularly suitable for feeding large dogs.

2.0 Related Art

It is well known by veterinarians experienced in the care and treatment of large dogs such as those of the mastiff breed that the health of such dogs may be adversely affected if such dogs are fed from a container positioned at floor level. Specifically, a large dog may have digestive problems and/or back misalignment problems due to being fed from a ground level container.

A number of elevated animal feeding devices are known which are provided for the purpose of improving the posture and digestion of animals such as large dogs, but are typically subject to one or more of the following problems: the inclusion of a large number of parts requiring a relatively complex assembly and relatively highly manufacturing cost; relatively large size and weight, making transportation difficult; they may be difficult to clean due to small open cavities, irregular shapes and sharp corners; and they may include parts which are subject to oxidation.

In view of the foregoing deficiencies associated with known animal feeder devices, applicant's invention is presented herein.

SUMMARY OF THE INVENTION

The present invention is directed to an animal feeder assembly for providing food and water at an elevated position from a support surface for animals, and in particular large dogs. In a preferred embodiment, the animal feeder assembly comprises a feeder tray and a plurality of hollow legs releasably attached to the tray. Each of the hollow legs are capable of holding ballast material for lowering the center of gravity of the assembly relative to the support surface, thereby enhancing the stability of the assembly.

In other preferred embodiments, the animal feeder assembly may include the following structural features and functions. At least one, or alternatively all, of the hollow legs are partially filled with ballast material which may be either sand, water or other suitable materials. The feeder tray and legs may be made of blow molded plastic, and the feeder tray includes a substantially flat top surface and means formed therein for receiving feeding containers. The receiving means may comprise a plurality of generally concave-shaped depressions and a plurality of raised ridges, with each of the depressions being partially circumvented by a pair of the raised ridges which are each partially annular in shape. First and second ones of each of the pair of ridges are each circumferentially spaced so as to form a pair of opposed spaces positioned between the first and second ridges, with each of the opposed spaces being effective for providing hand access for removing a food container disposed in a corresponding one of the depressions. Alternatively, the receiving means may comprise a plurality of apertures formed in the top surface of the tray.

The feeder tray further comprises a bottom surface having a plurality of receptacles formed therein, with each of the receptacles receiving one of the hollow legs. Each of the legs includes a first, tray-engaging portion which is releasably attached to one of the receptacles and includes an aperture formed therein. Each of the legs further includes a second portion which is connected to the tray-engaging portion and includes an interior cavity which communicates with the aperture formed in the tray-engaging portion. Each interior cavity is effective for receiving and containing ballast material which may be deposited through the corresponding aperture into the cavity prior to the tray-engaging portion being attached to the corresponding receptacle. The assembly may further comprise means for releasably locking each of the legs within corresponding ones of the receptacles. The locking means may comprise a plurality of protuberances formed within each of the receptacles and a plurality of recesses formed in the tray-engaging portion of each of the legs, wherein each of the recess engages one of the protuberances. Alternatively, each leg may include a plurality of circumferentially spaced and longitudinally extending protuberances which engage an inner surface of a corresponding one of the apertures in an interference fit so as to releasably retain each leg within the corresponding aperture. In the preferred embodiments the legs and corresponding apertures may either have a generally L-shaped, or circular, cross-section.

BRIEF DESCRIPTION OF THE DRAWINGS

The structural features and functions of the present invention, as well as the advantages derived therefrom, will become more apparent from the following detail description of the preferred embodiments when taken in conjunction with the accompanying drawings, wherein:

FIG. 1 is a front elevation view illustrating the animal feeder assembly of the present invention according to a preferred embodiment;

FIG. 2 is a plan view further illustrating the animal feeder assembly of FIG. 1;

FIG. 5 is an elevation view further illustrating one of the assembly legs of FIGS. 1–4;

FIG. 6 is a top end view of the leg illustrated in FIG. 5;

FIG. 7 is a bottom end view of the leg illustrated in FIG. 5;

FIG. 10 is an elevation view further illustrating one of the legs of the animal feeder assembly illustrated in FIGS. 8 and 9;

FIG. 11 is a top end view of the leg illustrated in FIG. 10;

FIG. 12 is a bottom end view of the leg illustrated in FIG. 10;

DETAILED DESCRIPTION

Figure 3:
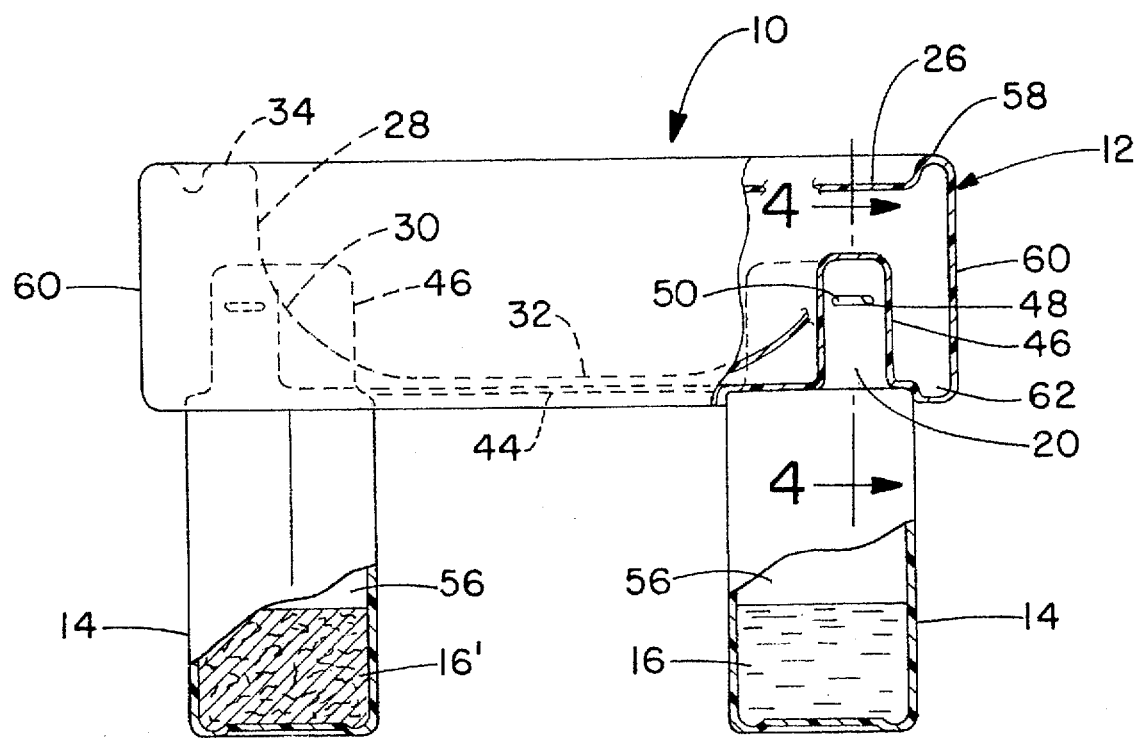
FIG. 3 is an end elevation view, partially in section and partially in cutaway view, taken along line 3—3 in FIG. 2, further illustrating the animal feeder assembly of FIGS. 1 and 2.

Referring now to the drawings, FIGS. 1–7 illustrate an animal feeder assembly 10 according to a preferred embodiment of the present invention. Feeder assembly 10 comprises a feeder tray 12 and a plurality of hollow legs 14 which are releasably attached to tray 12. Each of the hollow legs 14 are capable of holding ballast material 16 for the purpose of lowering the center of gravity of assembly 10 relative to a support surface 18, which may comprise a floor for instance in a residence. Lowering the center of gravity reduces the chances that assembly 10 will be tipped over by the animal during feeding. Additionally, the use of ballast 16 makes it more difficult for the animal to relocate assembly 10 from the preferred feeding location. In a preferred embodiment at least one, and most preferably all, of legs 14 are at least partially filled with ballast material 16 which may comprise a liquid such as water. Alternatively, a solid ballast material 16' such as sand may be used. Additionally, ballast material 16 and 16' may comprise other suitable non-toxic, non-corrosive weighting materials, particularly those which are commonly available. For instance, ballast 16' may also comprise rocks or metallic spheres such as BB's or ball bearings. Each leg 14 includes a tray-engaging portion 20 which includes an aperture 22 (shown in FIG. 6) which extends through an outer surface 24 of tray-engaging portion 20 accessing a cavity 56 in leg 14 and is therefore effective for receiving ballast material 16 prior to leg 14 being attached to tray 12 as subsequently described.

In a preferred embodiment, tray 12 and legs 14 are made of a plastic material, and most preferably, tray 12 and legs 14 is made of a high density polyethylene. The plastic material of tray 12 and legs 14 is preferably formed by a blow molded process, wherein any conventional blow molding process may be used. Alternatively, tray 12 and legs 14 may be formed by injection molding but this process may result in an increase in required material and the associated increase in assembly weight.

Feeder tray 12 includes a substantially flat top surface 26 and further includes a plurality of generally concave-shaped depressions 28 formed in top surface 26. Preferably each depression 28 includes a generally toroidally shaped portion 30 and a substantially flat portion 32 having a generally circular shape. Portions 30 and 32 are attached to one another and form a continuous, generally smooth surface of depression 28. Each depression 28 is at least partially circumvented by a pair of raised ridges 34 formed in top surface 26. Ridges 34 are partially annular in shape and are attached on one side to portion 30 of concave-shaped depression 28. The use of a plastic material, comprising high density polyethylene which is formed by a blow molded process in a preferred embodiment, provides generally smooth surfaces throughout tray 12 and smooth transitions among the various features of tray 12, including top surface 26, depressions 28 and ridges 34. Each pair of ridges 34 and a corresponding depression 28 combine to form a means for receiving a feeding container. This is all illustrated with respect to the depression 28 and corresponding ridges 34 shown on the left hand side of FIGS. 1 and 2, where the ridges 34 support the rim 36 of a feeding container, indicated generally at 38, and depression 28 supports a bowl portion 40 of container 38. It should be understood that alternatively, either food or water may be deposited directly within, and retained by, depressions 28. The individual ones of each pair of ridges 34, which partially circumvent a corresponding depression 28, are circumferentially spaced from one another so as to form a pair of opposed spaces 42 which are effective for providing hand access for removing a food container disposed in the corresponding one of depressions 28, such as container 38.

Figure 4:
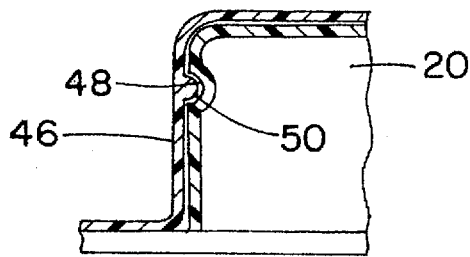
FIG. 4 is a sectional view taken along line 4—4 in FIG. 3, with the corresponding assembly leg removed for clarity.

Feeder tray 12 further includes a bottom surface 44, and a plurality of receptacles 46 formed in bottom surface 44, with each of the receptacles 46 receiving one of the hollow legs 14. The tray-engaging portion 20 of each leg, best shown in FIGS. 3, 5 and 6, is releasably attached to and releasably locked within the corresponding one of receptacles 46. A plurality of spaced apart recesses 48 are formed in the tray-engaging portion 20 of each leg 14. Each recess 48 engages a corresponding protuberance 50 which is formed on the inner surface of receptacle 46, as best seen in FIG. 4. Each leg 14 is releasably attached to tray 12, by inserting tray-engaging portion 20 into a corresponding one of receptacles 46, with protuberances 50 being snapped into place within corresponding ones of recesses 48 so as to releasably lock portion 20 within the corresponding receptacle 46. It should be understood that although a pair of recesses 48, formed in portion 20 of each leg 14, and a corresponding pair of protuberances 50, formed in each receptacle 46, are illustrated in the exemplary, preferred embodiment of FIGS. 1–7, other numbers of recesses and protuberances, as well as other forms of locking means, are considered to be within the scope of the present invention for the purpose of releasably locking portion 20 of leg 14 within receptacle 46. For instance, the male portions of the locking means such as protuberances 50 may be formed in portion 20 of each leg 14 with the corresponding female portions, such as recesses 48, formed in receptacle 46.

Each leg 14 further includes a portion 52 which has an inner or bottom surface 54 which may be placed in contacting engagement with a support surface, such as surface 18. As best seen in FIGS. 6 and 7, tray-engaging portion 20 and portion 52 each include an irregular, generally L-shaped cross-section, with the shapes of portions 20 and 52 being complementary to one another and the shape of portion 20 being complementary to the generally L-shaped cross-section of receptacle 46. Portion 52 includes an interior cavity 56 for receiving and containing ballast material 16 and cavity 56 also includes an irregular, L-shaped cross-section which is complementary to the shape of portion 52. Cavity 56 communicates with, or is accessed by, aperture 22 in portion 20. Accordingly, for each leg 14, ballast 16 may be deposited through aperture 22 into cavity 56 prior to tray-engaging portion 20 being inserted into receptacle 46. In a preferred embodiment, each leg 14 further includes a plug 27, in the general shape of a top hat, which may be inserted in aperture 22 after ballast 16 has been deposited into cavity 56. Plug 25 has a body portion 27 which engages aperture 22 and a rim portion 29 which contacts the outer surface 24 of tray-engaging portion 20 of leg 14. Body portion 27 may have a slight taper, for instance of 8–12 degrees, with the largest diameter end of body portion 27 attached to rim 29. It should be understood that plugs 25 may be omitted without adversely affecting the function of assembly 10. Portions 20 and 52 of leg 14 are shaped as shown for purposes of weight reduction relative to other potential shapes of hollow legs, such as those illustrated in the alternative embodiment of the present invention illustrated in FIGS. 8–11. However, it should be understood that weight reduced shapes other than those illustrated in FIGS. 6 and 7 may be used to construct legs 14. Additionally, although the shape of receptacle 46 and tray-engaging portion 20 must be complementary to one another, portion 52 of leg 14 may have a different shape than portion 20 if desired which may enhance the stability of assembly 10. It should be further understood that although tray 12 has been illustrated as including two concave-shaped depressions 28 and two corresponding pairs of raised ridges 34, which are effective for receiving two feeding containers, tray 12 may include other shapes or numbers of depressions 28 and the corresponding pairs of ridges 34 within the scope of the present invention.

Feeder tray 12 further includes a boundary ridge 58 and an edge surface 60 which combine to form the perimeter of tray 12. Edge surface 60 is integral with ridge 58, which is formed in top surface 26 of tray 12. Surface 60 is also integral with bottom surface 44 of tray 12. Top surface 26, bottom surface 44 and edge surface 60 are interconnected with one another so as to form a closed interior cavity 62 within tray 12. The closed nature of tray 12 and the included interior cavity 62 constitute an important feature of the preferred embodiment of the present invention since this facilitates cleaning of tray 12 as compared to a feeder tray which may include a number of cavities which are sized and shaped so as to trap food and are therefore difficult to clean. The cleaning of tray 12 of the present invention is further facilitated by the use of plastic material which is blow molded into the previously discussed shape, including generously radiused fillets between various features such as fillet 59 interconnecting boundary ridge 58 and top surface 26. Portions of tray 12, such as boundary ridge 58 and edge surface 60 may be textured per specification M.T. 11100 or the equivalent to produce a wrinkle surface finish to enhance the appearance of tray 12. The depth of the surface texturing may be in a range of 0.006–0.010 inches, and most preferably is approximately 0.008 inches.

Referring now to FIGS. 8–12, an animal feeder assembly 110 is illustrated according to an alternative embodiment of the present invention. In this embodiment, structural features which are similar to or the same as features of the embodiments illustrated in FIGS. 1–7 are indicated with reference numerals which are 100 greater than the reference numerals of the corresponding element in FIGS. 1–7. As with assembly 10 shown in FIGS. 1–7, assembly 110 includes a feeder tray 112 and a plurality of hollow legs 114 which are releasably attached to tray 112. Assembly 110 differs from assembly 10 with regard to the shape of legs 114, as compared to the shape of legs 14, and with respect to the corresponding shape of receptacles 146 which are formed in bottom surface 144 of tray 112, as compared to the shape of receptacles 46 of tray 12. Additionally, the manner of attaching legs 114 to receptacles 146 of tray 112 differs from the releasable locking engagement of legs 14 within receptacles 46, as subsequently discussed. However, other features of assembly 110 are the same as those of assembly 10. For instance, tray 112 includes a substantially flat top surface 126 and a plurality of concave-shaped depressions 128 formed in surface 126, as well as a plurality of raised ridges 134 formed in surface 126, with a pair of ridges 134 partially circumventing each of depressions 128. As with assembly 10, each depression 128 and a corresponding pair of ridges 134 of assembly 110 are effective for receiving a feeding container, such as container 38. Also, as with assembly 10, depressions 128 of assembly 110 may be effective in receiving food or water directly, without the use of a container such as container 38.

Figure 8:
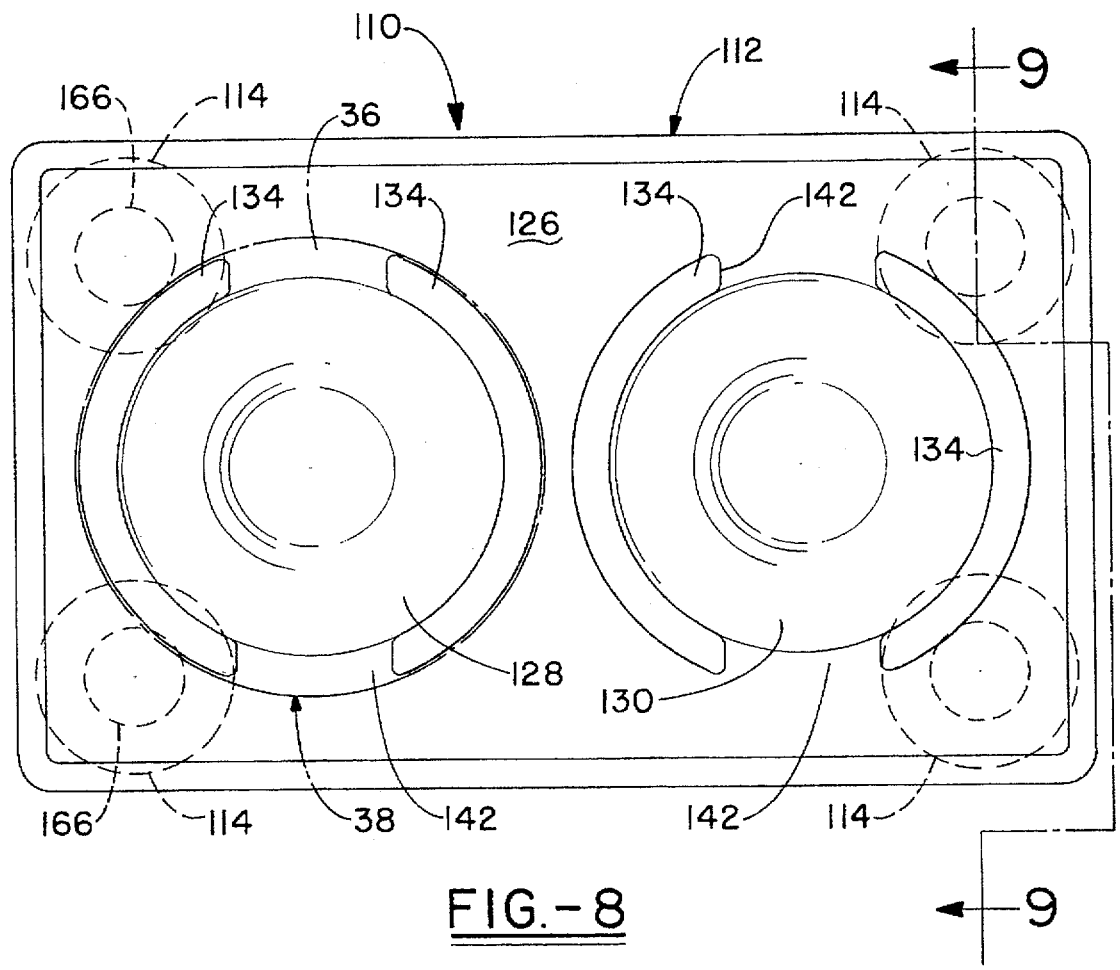
FIG. 8 is a plan view illustrating the animal feeder assembly of the present invention according to an alternative embodiment.
Figure 9:
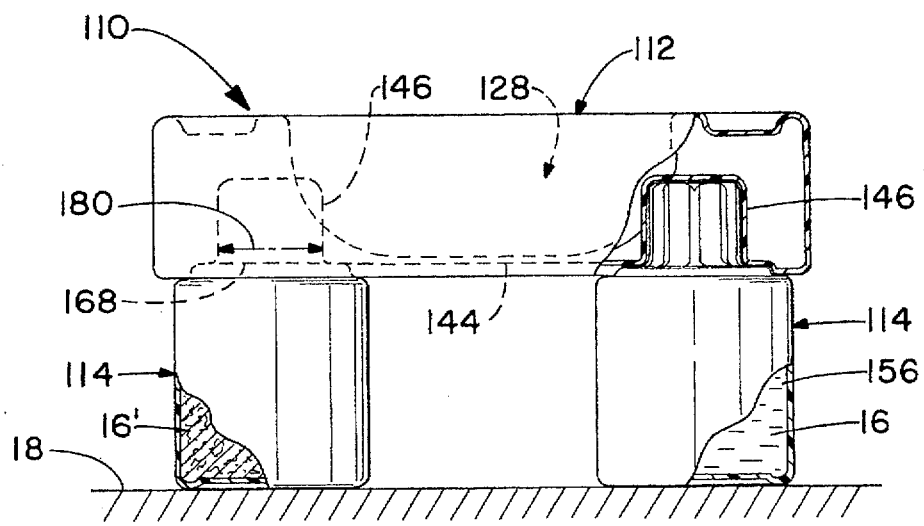
FIG. 9 is an end elevation view, partially in section and partially in cutaway view, taken along line 9—9 in FIG. 8, further illustrating the animal feeder assembly of FIG. 8.

As shown in FIGS. 8 and 9, each receptacle 146 has a generally circular cross-section 166 and is open at a bottom end 168 for receiving one of legs 114. Each leg 114 includes a tray-engaging portion 120 having a generally cylindrical shape as shown in FIGS. 10–12, and including a plurality of circumferentially spaced and longitudinally extending protuberances 170 which are formed in an otherwise circular outer surface 172 of portion 120. Protuberances 170 are sized, and positioned radially from a centerline axis 174 of leg 114 so that the outermost points 176 of each protuberance 170 may be interconnected by a circle having a diameter 178. Diameter 178 is slightly larger than an inside diameter 180 of apertures 146. Consequently, tray-engaging portion 120 of each leg 114 engages a corresponding one of receptacles 146 in an interference fit, so as to releasably attach each leg 114 to one of the receptacles 146 of tray 112. Legs 114 further include a second, generally cylindrical portion 182 which is connected to tray-engaging portion 120 via an intermediate annular shoulder portion 184. Portion 182 includes an outside diameter 186 which is greater than diameter 178 of tray-engaging portion 120. Portion 182 further includes an inner surface 154 which is operable for contacting a support surface such as surface 18. Additionally, portion 182 includes a generally cylindrically shaped interior cavity 156 for containing ballast material 16. Tray-engaging portion 120 includes an aperture 122 formed in and extending through an outer surface 124 of portion 120 which is effective for receiving ballast material 16 prior to portion 120 being inserted into receptacle 146. Similar to legs 14, each leg 114 may further include a plug 125 having a body portion 127 engaging aperture 122 and a rim portion 129 contacting outer surface 124, with plug 125 being inserted in aperture 122 after ballast material 16 has been deposited in cavity 156.

Figure 13:
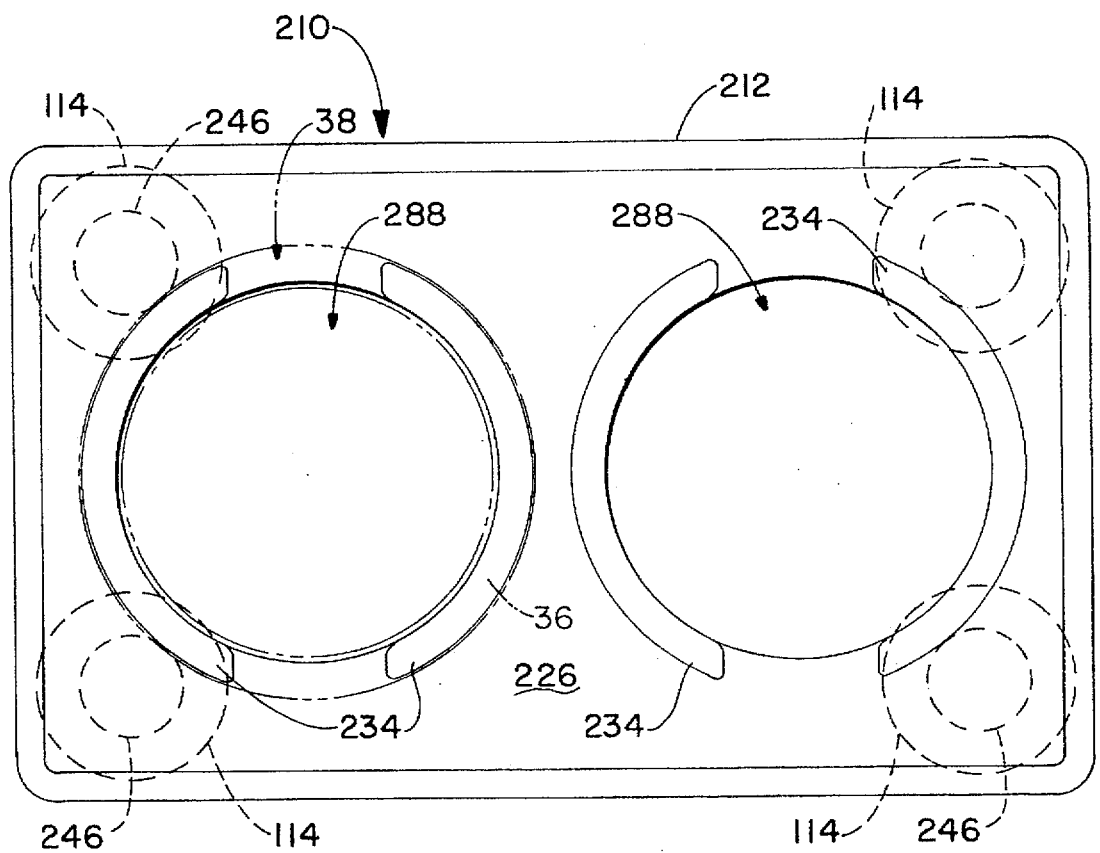
FIG. 13 is a plan view illustrating the animal feeder assembly of the present invention according to another alternative embodiment.
Figure 14:
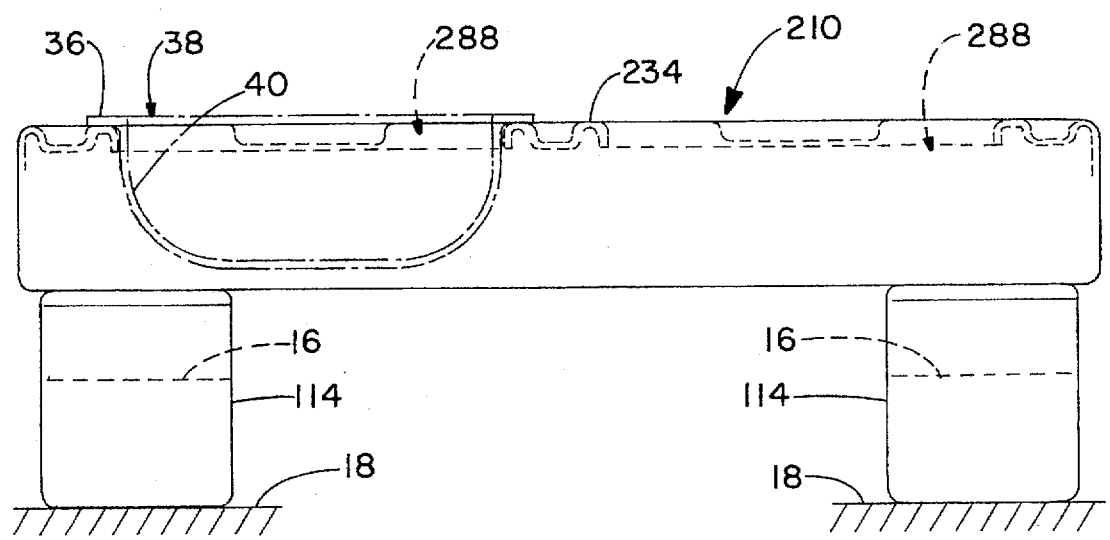
FIG. 14 is a front elevation view further illustrating the animal feeder assembly of FIG. 12.

Referring now to FIGS. 13 and 14, an animal feeder assembly 210 is illustrated according to another alternative embodiment of the present invention. Assembly 210 includes a feeder tray 212 and a plurality of hollow legs 114 which are releasably attached to tray 212. Tray 212 is identical to tray 112 of assembly 110 with the exception that the generally concave-shaped depressions 28 of tray 112 are replaced with a corresponding plurality of apertures 288 which are formed in top surface 226 of tray 212. Each aperture 288 combines with a pair of corresponding ridges 234, which partially circumvent the corresponding aperture 288, to provide a means for receiving a feeding container such as container 38, illustrated with respect to the aperture 288 and ridges 234 shown on the left hand side of FIGS. 13 and 14. However, unlike the concave-shaped depressions 28, 128 of previous embodiments, apertures 288 are not effective for the direct containment of food or water. Additionally, due to the inclusion of apertures 288, tray 212 does not include a closed interior cavity thereby making the cleaning of tray 212 more difficult than the cleaning of trays 12 and 112.

Figure 15A:
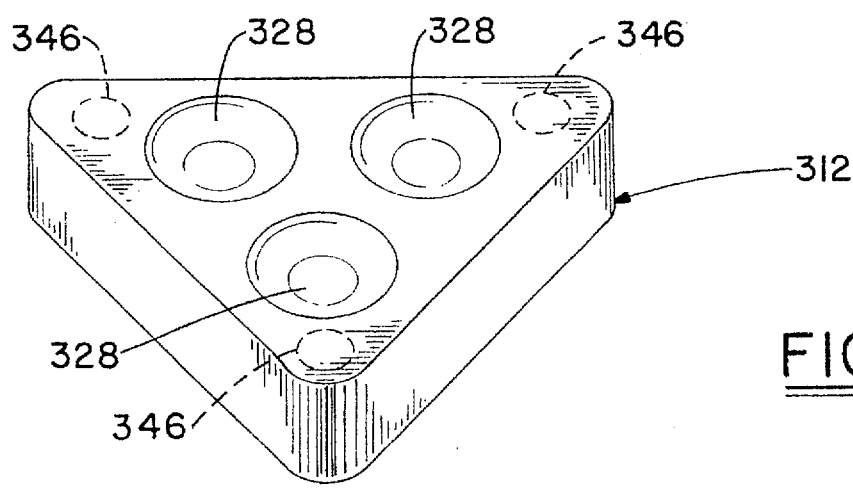
FIGS. 15A–15C are perspective views illustrating other alternative embodiments of the animal feeder assembly of the present invention, with the assembly legs not shown.
Figure 15B:
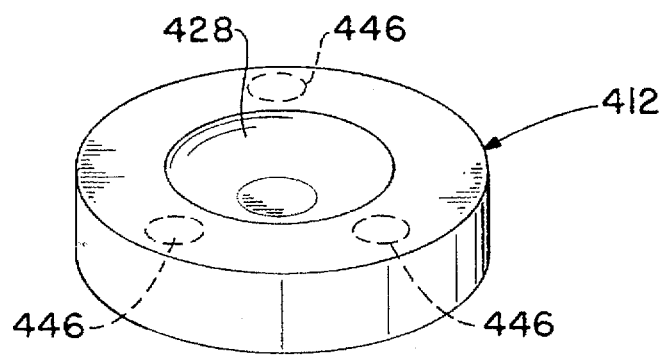
Figure 15C:
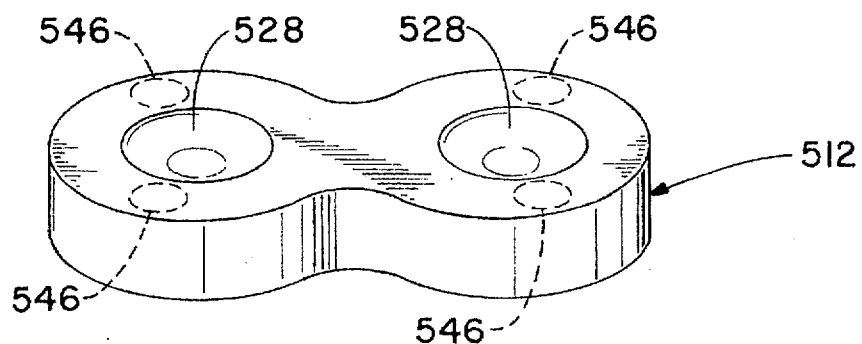

FIGS. 15A–15C illustrate alternative embodiments of the feeder trays of the present invention, indicated at 312, 412 and 512, respectively. As shown in FIG. 15A, the perimeter of tray 312 is generally triangular such that tray 312 is generally pie-shaped. Additionally, tray 312 includes three concave-shaped depressions 328. As shown in FIG. 15B, tray 412 has a generally circular perimeter such that tray 412 is generally disk-shaped and further, tray 412 includes a single depression 428 for the purpose of receiving a feeding container. As shown in FIG. 15C, the perimeter of tray 512 is irregular such that tray 512 is formed generally in the shape of a dog bone. Further, as shown in FIG. 15C, tray 512 includes a pair of depressions 528 for the purpose of receiving feeding containers. Trays 312, 412 and 512 are illustrated as including generally circular apertures 346, 446 and 546, respectively, which are the same as apertures 146 and 246 illustrated in trays 112 and 212, respectively, for purposes of receiving legs 114. However, trays 312, 412 and 512 may alternatively include irregularly shaped apertures which are effective for receiving hollow legs of a complementary shape, such as those of legs 14 illustrated in FIGS. 5–7.

While the foregoing description has set forth the preferred embodiments in particular detail, it must be understood that numerous modifications, substitutions and changes can be undertaken without departing from the true spirit and scope of the present invention as defined by the ensuing claims. Accordingly, the invention is therefore not limited to the specific preferred embodiments as described but is only limited as defined by the following claims.

What is claimed:

1. An animal feeder assembly for providing food and water at an elevated position from a support surface, said animal feeder assembly comprising:

a feeder tray;

a plurality of substantially hollow spaced-apart legs releasably attached to said feeder tray; and wherein each of said hollow legs receives a removable ballast material therein for lowering the center of gravity of said animal feeder assembly relative to the support surface, thereby enhancing the stability of said animal feeder assembly.

2. The animal feeder assembly as recited in claim 1, wherein said removable ballast material is selected from the group consisting of sand, water, rocks and metallic spheres.

3. The animal feeder assembly as recited in claim 1, wherein said feeder tray is made of molded plastic.

4. The animal feeder assembly as recited in claim 3, wherein said hollow legs are made of molded plastic.

5. The animal feeder assembly as recited in claim 4, wherein said feeder tray and said legs are made of blow molded plastic.

6. The animal feeder assembly as recited in claim 1, wherein said feeder tray includes:

a substantially flat top surface; and means formed in said top surface for receiving at least one feeding container.

7. The animal feeder assembly as recited in claim 6, wherein said feeder tray and said legs are made of blow molded plastic.

8. The animal feeder assembly as recited in claim 6, wherein:

said receiving means comprises a plurality of generally concave-shaped depressions effective for receiving a feeding container, at least one of said concave-shaped depressions having a periphery and a raised ridge area at least partially circumventing said at least one depression.

9. The animal feeder assembly as recited in claim 8, wherein said raised ridge area is partially annular in shape and comprises at least first and second raised ridges circumferentially spaced about said at least one depression so as to form at least one space positioned between said first and second ridges, providing hand access for removing a food container disposed in said at least one depression.

10. The animal feeder assembly as recited in claim 6, wherein said receiving means comprises at least one aperture formed in said top surface.

11. The animal feeder assembly as recited in claim 6, wherein said feeder tray has a bottom surface and includes means for releasably engaging said spaced apart hollow legs.

12. The animal feeder assembly as recited in claim 11, wherein said engaging means comprises a plurality of receptacles formed in said bottom surface, and wherein each of said legs includes a tray-engaging portion which is releasably attached to a corresponding one of said receptacles.

13. The animal feeder assembly as recited in claim 12, further comprising means for releasably locking each of said legs within a corresponding receptacle.

14. The animal feeder assembly as recited in claim 13, wherein said locking means comprises at least one protuberance formed within each of said receptacles, and a plurality of recesses formed in said tray-engaging portion of each of said legs, such that said recesses engage said protuberances when said tray-engaging portion of each of said legs is inserted into one of said receptacles.

15. The animal feeder assembly as recited in claim 14, wherein each of said hollow legs is generally L-shaped in cross-section along at least a portion thereof.

16. The animal feeder assembly as recited in claim 12, wherein each of said receptacles has a generally circular cross-section having a first diameter and is open at a bottom end for receiving one of said hollow legs and wherein each of said tray-engaging portions is generally cylindrically shaped so that said tray-engaging portion of each of said legs engages a corresponding receptacle in an interference fit.

17. The animal feeder assembly as recited in claim 12, wherein said feeder tray further includes a continuous perimeter-forming edge surface forming a closed interior cavity within said feeder tray.

18. The animal feeder assembly as recited in claim 1, wherein:

said feeder tray includes a plurality of receptacles for receiving said hollow legs;

said assembly further comprises means for releasably locking each of said legs within corresponding ones of said receptacles.

19. An animal feeder assembly, comprising:

a feeder tray including a substantially flat top surface with at least one depression formed therein, a raised ridge formed in said top surface and at least partially circumventing said at least one depression, a peripheral boundary ridge formed in said top surface, a bottom surface and a sidewall surface interconnecting said top surface and said bottom surface such that said feeder tray defines a closed interior cavity; and a plurality of legs connected to said feeder tray for supporting said feeder tray above a support surface.

20. An animal feeder assembly as recited in claim 19, wherein each of said plurality of legs is hollow and receives ballast material.

21. An animal feeder assembly as recited in claim 20, wherein said ballast material is selected from the group consisting of sand, water, rocks, and metallic spheres.

22. An animal feeder tray as recited in claim 20, wherein feeder tray said and said plurality of legs are made of molded plastic.

23. An animal feeder assembly as recited in claim 19, wherein said feeder tray is made of molded plastic.

24. The animal feeder assembly as recited in claim 19 wherein at least one of said plurality of legs is hollow and is at least partially filled with ballast material.

* * * * *